United States Patent [19]

Knickerbocker

[11] 4,216,934
[45] Aug. 12, 1980

[54] UNIVERSAL MOUNTING BRACKET FOR CIRCUIT BLOCKS

[75] Inventor: Robert H. Knickerbocker, Cheshire, Conn.

[73] Assignee: The Siemon Company, Watertown, Conn.

[21] Appl. No.: 883,888

[22] Filed: Mar. 6, 1978

[51] Int. Cl.² ............................................. A47F 7/00
[52] U.S. Cl. ................................. 248/309 A; 211/26
[58] Field of Search ................... 248/309, 15; 211/26; 339/17 C, 17 N, 198 R, 198 G; 336/67; 174/52 R; 361/401

[56] References Cited

U.S. PATENT DOCUMENTS

| | | | |
|---|---|---|---|
| 1,620,047 | 3/1927 | Valkenburg | 312/245 UX |
| 2,086,198 | 7/1937 | Weston | 248/27.1 |
| 2,681,194 | 6/1954 | Halvorsen | 248/495 |
| 2,841,772 | 7/1958 | Sloop | 336/67 |
| 2,871,284 | 1/1959 | Wills | 174/52 |
| 3,124,408 | 3/1964 | Oestereicher | 85/47 X |
| 3,311,435 | 3/1967 | Heritage | 312/245 |
| 3,724,315 | 4/1973 | Sygnator | 85/47 |
| 3,791,709 | 2/1974 | Cross | 312/245 |
| 3,859,570 | 1/1975 | Veranth | 317/100 |
| 3,915,541 | 10/1975 | Flegel | 339/198 R |

Primary Examiner—J. Franklin Foss

Attorney, Agent, or Firm—Fishman and Van Kirk

[57] ABSTRACT

A mounting bracket for use in mounting quick connect circuit blocks to a wall or pipe comprising a pair of flanges for attachment of the bracket to the wall, a block supporting beam for supporting the circuit block, the block supporting beam being parallel to and spaced from the flanges by connecting webs. A pair of dowel-like protrusions project from the center of the beam and provide a fixed point about which the terminal block can be suspended and allowed to pendulate and come to rest in a vertical position. A method of mounting the bracket is disclosed wherein a first bracket is leveled and mounted on a wall, a second bracket is affixed to a first circuit block, and the first circuit block is suspended from one of the dowel-like protrusions and allowed to pendulate and to come to rest in a vertical position. The circuit block is then affixed to the first bracket and the second bracket is affixed to the wall. If more than one circuit block is to be mounted, the dowel-like protrusion on the second bracket provides a fixed point about which a second circuit block can pendulate. The mounting procedure can be repeated with a number of circuit blocks and only one bracket must be leveled on the wall, and the remainder of the brackets are automatically leveled.

10 Claims, 5 Drawing Figures

UNIVERSAL MOUNTING BRACKET FOR CIRCUIT BLOCKS

Background of the Invention

(1) Field of the Invention

This invention relates to mounting brackets for use in mounting circuit blocks such as terminal blocks of the type that are used in telephone systems. The invention also relates to a method of mounting the brackets.

(2) Description of the Prior Art

Circuit blocks as used in electrical systems usually have a three-dimensional rectangular shape and have a number of terminals which project outwardly from opposite sides of the blocks so that wires can be connected to the terminals.

When used in telephone systems, the circuit blocks are mounted on walls by use of brackets which are customized for various sizes and shapes of circuit blocks.

When the circuit blocks are mounted on walls by the use of metal brackets on each end of the blocks, short circuiting problems may be encountered if the mounting brackets are not perfectly aligned. In order to try to minimize short circuiting problems, an elaborate mounting procedure has to be employed in which one bracket would be positioned and leveled both vertically and horizontally. Then a precise distance had to be measured to locate a second bracket. The second bracket then was positioned and leveled both horizontally and vertically.

It is an object of the present invention to reduce the amount of time necessary to position and level brackets during installation of circuit blocks. It is another object of the present invention to provide a mounting bracket for mounting circuit blocks to walls, the brackets allowing for simplified positioning and leveling. Another object of the present invention is to provide a method for mounting brackets and circuit blocks which allows for quick and simple positioning and leveling of the brackets. It is another object to provide a universal mounting bracket that can be used with all conventional quick connect blocks.

Summary of the Invention:

The present invention provides a mounting bracket having a pair of flanges for attachment of the bracket to a surface such as a wall. A block supporting beam is parallel to and spaced from the flanges by a pair of connecting webs. A pair of dowel-like protrusions project from the surface of the beam, and each protrusion provides a fixed point upon which a quick connect block can be suspended and allowed to pendulate.

A method of mounting the modular circuit blocks on a wall with the brackets is provided wherein the mounting procedure includes the steps of (1) leveling and affixing a first bracket on a wall, (2) affixing a second bracket to a modular circuit block, (3) suspending the modular circuit block from one of the dowel-like protrusions on the first mounting bracket and allowing the block to pendulate and come to rest in a vertical position, and (4) affixing the second bracket to the wall and affixing the first bracket to the modular circuit block. The other dowel-like protrusion on the second circuit block can provide a fixed point about which a second block can pendulate. The above method may be repeated until a desired set of modular circuit blocks are mounted vertically on the wall. With the above-mentioned method, only one bracket must be leveled and positioned for each set of circuit blocks.

Figure 2:
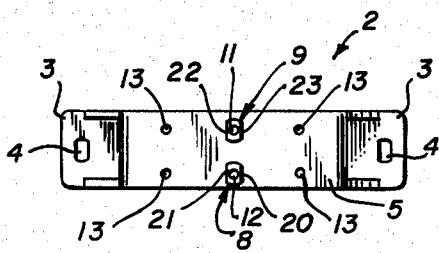
FIG. 2 is a top elevational view of a mounting bracket.
Figure 3:
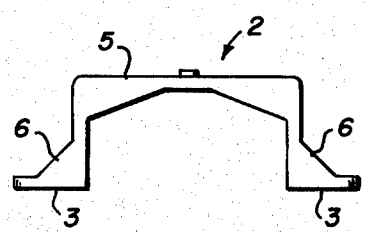
FIG. 3 is a side elevational view of a mounting bracket.
Figure 4:
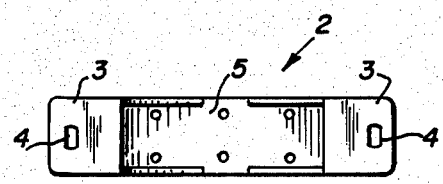
FIG. 4 is a bottom elevational view of a mounting bracket.
Figure 1:
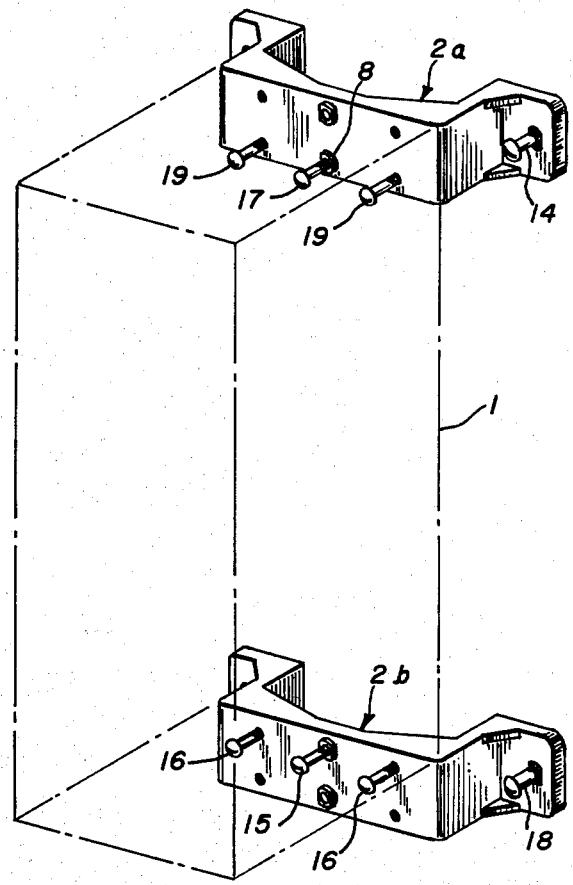
FIG. 1 is a perspective view of two mounting brackets with a circuit block positioned thereon.

Detailed Description of the Invention:

FIG. 1 depicts a circuit block 1, which has been shown in phantom, affixed to mounting brackets 2a and 2b.

As shown in the FIGURES, the mounting brackets 2 include a pair of flanges 3 which provide for attachment of bracket 2 to a surface such as a wall. Flanges 3 are provided with elongated holes 4 so that when bracket 2 is mounted to a wall, bracket 2 can be leveled. A rectangularly shaped block supporting beam 5 is parallel to and spaced from flanges 3 by connecting webs 6 which provide support for block supporting beam 5. Projecting from upper surface 7 of block supporting beam 5 are two dowel-like protrusions 8 and 9 which include respectively holes 11 and 12 for self-tapping screws which allow for attachment of circuit block 1 to beam 5. Beam 5 also includes four holes 13 which may be used for self-tapping screws.

Referring to FIG. 1, circuit block 1 is mounted on a wall by the following method. First mounting bracket 2a is leveled and affixed to a wall by screws 14. Second mounting bracket 2b is affixed to circuit block 1 by screw 15, or if the configuration of the block dictates, by screws 16. Then, circuit block 1 is suspended from dowel-like protrusion 8 of bracket 2a by the mating of dowel-like protrusion 8 with an aperture (not shown) in circuit block 1. It should be understood that conventional circuit blocks include round centered apertures through the blocks and that the brackets of the present invention can be used with these blocks by a fastener through the center hole tapping into the dowel. Screw 17 may be inserted partially into hole 12 in bracket 2a to allow for suspension of circuit block 1 from dowel-like protrusion 8 while allowing for relatively free pendulation of circuit block 1 about dowel-like protrusion 8. Dowel-like protrusions 8 and 9 have a cylindrical shape and include respectively chordal edge cuts 20 and 21, and chordal edge cuts 22 and 23, which allow for relatively free pendulation of the circuit block 1. Although this construction is preferred, it should be understood that protrusions which provide a fixed point about which circuit block 1 can pendulate may be used. Some quick connect blocks have holes at each end, through which screws are passed to tap into hole 13 to fasten the block to the bracket. All of these blocks have openings which will receive the dowels but not necessarily to pendulate.

When, under the force of gravity, circuit block 1 comes to rest in a vertical position, mounting bracket 2b is affixed to the wall by screws 18 and circuit block 1 is affixed to bracket 2a by screwing screw 17 the remainder of the way into hole 12 and, if additional stability is desired, screws 19 can be screwed into holes 13.

It should be understood that mounting bracket 26 is leveled automatically by the above mounting method.

dowel-like protrusion 8 on bracket 2b is now available for a second circuit block to be suspended thereon and attached to the wall by bracket 2b and a third bracket. In this manner, any number of circuit blocks may be mounted vertically to the wall and it is necessary to level only the first mounting bracket of the set of mounting brackets required to attach the circuit blocks.

Figure 5:
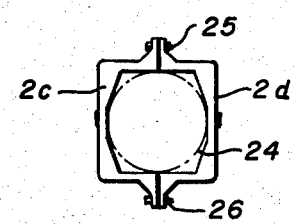
FIG. 5 is a top elevational view of two mounting brackets attached to a pipe.

It is often desirable to attach circuit blocks to pipes as well as to walls. FIG. 5 shows a first pair of mounting brackets 2c and 2d mounted on pipe 24. Flanges 3 of bracket 2c and flanges 3 of bracket 2d are held in face to face relation by nut and bolt assemblies 25 and 26. A similar second pair of brackets is mounted on the pipe spaced from brackets 2c and 2d. At least one circuit block may then be attached to each of brackets 2c and 2d and the spaced second pair of brackets.

Although mounting brackets 2 are shown with two spaced apart dowel-like portrusions 8 and 9, it should be understood that two protrusions are necessary when it is desired to mount more than one circuit block. When mounting only one circuit block, it is possible to use brackets having only one dowel-like protrusion.

Mounting brackets 2 may be made of any material which is capable of supporting circuit block 1. It is preferred that the mounting bracket be made of plastic, such as LEXAN as sold by The General Electric Company.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. A mounting bracket for use in affixing circuit blocks to a surface, the bracket comprising:
   (a) a block supporting beam for supporting a circuit block;
   (b) mounting means for attaching said block supporting beam to the surface, and;
   (c) pendulating means on said block supporting beam, said pendulating means comprising at least a first protrusion having an arcuate support surface, said support surface providing a point about which a circuit block can pendulate with respect to said beam.

2. A bracket according to claim 1 wherein said mounting means comprises a pair of connecting webs extending from said block supporting beam at opposite ends thereof and flanges extending from each of said webs for attachment of the bracket to the surface, said flanges being generally parallel to said beam.

3. A method of mounting circuit blocks to a pipe comprising:
   (a) affixing a pair of brackets as claimed in claim 1 in flange to flange relation around the pipe,
   (b) affixing a second pair of brackets as claimed in claim 1 in flange to flange relation around the pipe, and
   (c) affixing at least one circuit block to said block supporting beams of said brackets.

4. A bracket according to claim 2 wherein said pendulating means comprises two dowel-like protrusions projecting from said block supporting beam, said bracket being symmetrical about an axis on which said two dowel-like protrusions are located.

5. A bracket according to claim 4 wherein said flanges include an elongated circular hole to allow for leveling of the bracket on the wall.

6. A bracket according to claim 5 wherein each of said dowel-like protrusions includes a hole therein to allow for self-tapping of a screw and for attachment of said circuit block to said bracket.

7. A mounting bracket for mounting circuit blocks to a surface, the bracket comprising:
   (a) flanges for attachment of the bracket to the surface,
   (b) a block supporting beam parallel to and spaced from said flanges by a pair of webs, and
   (c) at least one dowel-like protrusion projecting outwardly from said block supporting beam and being capable of providing a point about which said circuit block can pendulate and come to rest in a vertical position.

8. A method for mounting a circuit block on a surface comprising:
   (a) leveling and affixing a first bracket as claimed in claim 7 on the surface,
   (b) affixing a second bracket as claimed in claim 7 on one end of the circuit block,
   (c) suspending another end of the circuit block from said dowel-like protrusion of said first bracket and allowing the block to pendulate and come to rest in a vertical position, and
   (d) affixing the second bracket to said surface and affixing said circuit block to said first bracket.

9. A method of mounting circuit blocks to a pipe comprising:
   (a) affixing a pair of brackets as claimed in claim 7 in flange to flange relation around the pipe,
   (b) affixing a second pair of brackets as claimed in claim 7 in flange to flange relation around the pipe, and
   (c) affixing at least one circuit block to said block supporting beams of said brackets.

10. A mounting bracket as in claim 7 further including: a second dowel-like protrusion projecting outwardly from said block supporting beam, said second protrusion being capable of providing a point about which a circuit block can pendulate and come to rest in a vertical position, the axes of said protrusions being aligned on an axis of symmetry of the mounting bracket.

* * * * *